United States Patent [19]

Moriwaki et al.

[11] 4,376,840
[45] Mar. 15, 1983

[54] FLAME RETARDANT LIQUID RUBBER COMPOSITION

[75] Inventors: Toshimoto Moriwaki; Kiyoshi Hani; Shigeru Kubota; Shohei Eto; Akira Fukami; Ichiro Yamasaki, all of Amagasaki, Japan

[73] Assignee: Mitsubishi Denki Kabushiki Kaisha, Tokyo, Japan

[21] Appl. No.: 194,843

[22] Filed: Oct. 7, 1980

[30] Foreign Application Priority Data

Oct. 24, 1979 [JP] Japan .................. 54-137997
Nov. 29, 1979 [JP] Japan .................. 54-156531

[51] Int. Cl.³ .......................... C08K 3/22; C08L 9/00
[52] U.S. Cl. .................................. 524/779; 524/310; 524/430; 524/436; 524/786; 524/871; 524/873; 524/875
[58] Field of Search .............. 524/871, 873, 875, 779, 524/786, 436, 430, 310

[56] References Cited

U.S. PATENT DOCUMENTS

| | | | |
|---|---|---|---|
| 3,058,955 | 10/1962 | Neumann et al. | 524/871 |
| 3,338,861 | 8/1967 | Mastin et al. | 524/871 |
| 3,351,573 | 11/1967 | Skreckoski | 524/871 |
| 3,404,130 | 10/1968 | Sigura et al. | 524/873 |
| 3,436,361 | 4/1969 | Wooster | 524/875 |
| 3,538,038 | 11/1970 | Blanc et al. | 524/786 |
| 3,950,304 | 4/1976 | Inomata et al. | 524/445 |
| 4,001,128 | 1/1977 | Penneck | 524/430 |
| 4,053,446 | 10/1977 | Watabe et al. | 524/873 |
| 4,066,599 | 1/1978 | Zimmerman | 524/875 |
| 4,102,716 | 7/1978 | Groves et al. | 524/871 |
| 4,147,690 | 4/1979 | Rich | 524/436 |

*Primary Examiner*—Ronald W. Griffin
*Attorney, Agent, or Firm*—Oblon, Fisher, Spivak, McClelland & Maier

[57] ABSTRACT

A flame retardant liquid rubber composition comprises a hydrogenated polyhydroxybutadiene polymer and castor oil, which are modified with an isocyanate having the formula

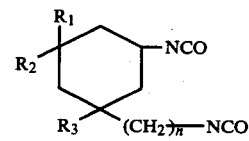

wherein $R_1$, $R_2$ and $R_3$ respectively represent a lower alkyl group or hydrogen atom and n is an integer of 1 to 4, and alumina hydrate and magnesium hydroxide. The castor oil can be incorporated before adding said isocyanate or can be converted into an isocyanate prepolymer by reacting with said isocyanate before the addition.

6 Claims, No Drawings

FLAME RETARDANT LIQUID RUBBER COMPOSITION

BACKGROUND OF THE INVENTION

1. Field of the Invention

The present invention relates to a non-flammable liquid rubber composition having high electric insulating property, high arc resistance, high tracking resistance.

2. Description of the Prior Art

In a case of arcing in electric instruments such as a mold transformer and a transformer, organic materials used as insulators are decomposed to form a carbon powder which forms a low electric resistant path to cause fault of the electric instrument in a short time.

The electric instruments are usually used for a long time in various environments at high temperature in high humidity with much dust, and accordingly, sometimes, they may cause tracking breakdown. Sometimes, a firing fault is found by arcing caused by a sudden short-circuit. Thus, the mold composition used as the insulator should have high electric insulating property, high arc resistance, high tracking resistance and high flame retardancy so as to prevent such fault.

In order to satisfy such required characteristics, it has been well-known to use composition incorporating a conventional molding material such as elastomers such as ethylenepropylene terpolymer (EPT) and butyl rubber; thermosettable resins such as epoxy resin and unsaturated polyester resin and a flame retardant filler such as alumina hydrate ($Al_2O_3.3H_2O$). It has been also known to incorporate a halogen type flame retardant. This method, however causes disadvantages that a desired effect is not expected unless a large amount of the alumina hydrate or the other flame retarder is incorporated and the electric characteristics may be remarkably deteriorated.

The epoxy resin and the unsaturated polyester resin are respectively excellent molding materials which are moldable in a liquid form to be excellent processability, however, their cured products have relatively low arc resistance and low tracking resistance and have low hydrolysis resistance and accordingly, the products are not suitable to be use in outdoor or in an environment at high temperature in high humidity.

On the other hand, EPT rubber and butyl rubber as the elastomer are desired molding materials in view of high insulating property and stability in various environmental conditions. EPT rubber and butyl rubber, however, have large molecular weights and low fluidity and accordingly, they should be molded at high temperature under high pressure whereby the electric instruments should be prepared by a compressive molding method, an extrusion molding method, a transfer molding method, etc. When the electric instruments are prepared by said molding methods, there is a possibility to cause deformation or deviation of the packed part under the condition of high temperature and high pressure or to cause insufficient insulation because the rubber is not completely filled in the space for insulation among coil layers and between a primary coil and a secondary coil as the fluidity of the rubber is not sufficient. In order to prevent such insufficient insulation, it has been necessary to reinforce the packed part against the pressure or to treat it for sufficient insulation before the molding, in the conventional one. Moreover, expensive apparatus and mold are required for the molding at high temperature under high pressure and a large energy consumption is required. The conventional method has not been a desired process for production.

In usual, it has been proposed to incorporate antimony oxide, an organic halogen-containing compound or a phosphoric acid ester at a ratio of several tens % or to blend a polyvinyl chloride or to copolymerize vinyl chloride for the purpose of flame retardant treatment of a polyolefin. Such methods have disadvantages that antimony oxide and phosphoric acid esters are toxic or a halogen-containing gas is formed or electrical or mechanical characteristics are deteriorated depending upon the kind and amount of the flame retarder. As the other flame retardant method, it has been proposed to incorporate an inorganic compound having crystal water. In such case, a large amount of the inorganic compound should be incorporated for imparting sufficient flame retardancy whereby the mechanical characteristic of the resin composition is remarkably inferior. The above-mentioned flame retarding manners have been considered to be useful for the flame retardancy of the olefin type resin depending upon the usages, however, there are many problems for overcoming said disadvantages.

SUMMARY OF THE INVENTION

It is an object of the present invention to overcome the disadvantages in the conventional cases.

Another object of the present invention is to provide a flame retardant liquid rubber composition which can be used for productions of electric instruments by a vacuum casting or an impregnation process which do not require to be performed at high temperature under high pressure and which provides a cured product having excellent elasticity, high electric insulating property, high arc resistance, high tracking property and high flame retardancy.

The foregoing and other objects of the present invention have been attained by providing a flame retardant liquid rubber composition which comprises a hydrogenated polyhydroxybutadiene polymer and castor oil, which are modified with an isocyanate having the formula

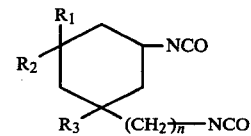

wherein $R_1$, $R_2$ and $R_3$ respectively represent a lower alkyl group or hydrogen atom and n is an integer of 1 to 4, and alumina hydrate and magnesium hydroxide.

DETAILED DESCRIPTION OF THE PREFERRED EMBODIMENTS

The castor oil is used together with the hydrogenated polyhydroxybutadiene polymer (hereinafter referring to as hydrogenated polymer) as the major component or it is also used in a form of an isocyanate prepolymer obtained by reacting the castor oil with an isocyanate as a curing agent. When the castor oil is used as a part of the major component, it is preferable to incorporate 10 to 150 wt. parts of castor oil; 60 to 180 wt. parts of alumina hydrate, 5 to 60 wt. parts of magnesium hydroxide and said isocyanate as a curing agent to 100 wt. parts of the hydrogenated polyhydroxybutadiene polymer. The isocyanate as the curing agent is preferably incorporated at ratio of 0.8 to 1.5 equivalent of isocyanate group of the isocyanate to 1 equivalent of hydroxyl group of the hydrogenated polymer and the castor oil.

When the castor oil is used in a form of an isocyanate prepolymer obtained by reacting the castor oil with the isocyanate as a curing agent, it is preferable to incorporate 60 to 150 wt. parts of alumina hydrate and 5 to 30 wt. parts of magnesium hydroxide to 100 wt. parts of the hydrogenated polymer and the isocyanate prepolymer as the curing agent.

The flame retardant liquid rubber composition of the present invention is preferably used for insulation of electric instruments and imparts excellent processability for easy casting, impregnation and coating to provide a cured elastic product having excellent electric insulating property, high arc resistance, high tracking resistance, high water resistance, high heat resistance and flame retardancy.

In accordance with the present invention, it provides a flame retardant liquid rubber composition which can be used for preparing various electric instruments by a vacuum casting or an impregnation process which do not require to perform at high temperature under high pressure to provide a cured product having excellent elasticity and excellent flame retardancy, high arc resistance and high tracking resistance.

The liquid rubber of the present invention is formed by reacting the hydrogenated polyhydroxybutadiene polymer and the castor oil with the isocyanate to have crosslinkages of urethane bonds

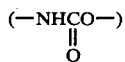

and an olefin structure having methylene bonds as a skeleton of a main chain. The isocyanate prepolymer obtained by reacting the isocyanate with the castor oil can be used to react with the hydrogenated polyhydroxybutadiene polymer to form the urethane bonds.

The hydrogenated polyhydroxybutadiene polymers can be obtained by a hydrogenation of a polyhydroxybutadiene polymer which is obtained by a radical polymerization or a living polymerization of butadiene to form terminal hydroxyl groups as pendant groups. The hydrogenated polyhydroxybutadiene polymers can be also obtained by a hydrogenation of a homopolymer of 1,3-butadiene or a copolymer of butadiene and less than 50 wt.% of a vinyl monomer such as styrene, acrylonitrile, methacrylic acid, vinyl toluene and vinyl acetate. By the hydrogenation, the unsaturated bonds derived from butadiene are saturated. The hydrogenated polyhydroxybutadiene polymer has hydroxyl groups at an average ratio of more than 1.5 preferably 1.5 to 5 per one molecule.

The castor oil used together with the hydrogenated polymer can be commercially available castor oils. Any modified castor oil can be used if the modified castor oil is compatible to the hydrogenated polymer and is not one which forms volatile matters such as carbon dioxide gas etc. in the reaction with the isocyanate.

The purified castor oil or hydrogenated castor oil can be preferably used as the castor oil.

When the castor oil is used together with the hydrogenated polymer as the major component, when the amount of the castor oil is less than 10 wt. parts, a pot-life of the mixture with the curing agent is too short so as to decrease the processability and a permanent elongation of a cured product is too large. When the amount of the castor oil is more than 150 wt. parts, the mechanical property of the cured product is disadvantageously inferior.

When the castor oil is used in a form of the isocyanate prepolymer, the isocyanate prepolymer as the curing agent can be obtained by the conventional urethane reaction of the castor oil and the isocyanate. When the isocyanate prepolymer is used as the curing agent, the castor oil can be also used as a part of the major component together with the hydrogenated polymer.

The typical isocyanate having said formula which is commercially available is 3-isocyanatomethyl-3,5,5-trimethylcyclohexyl isocyanate which has the formula wherein $R_1$, $R_2$ and $R_3$ are methyl groups. The isocyanate to be used in the present invention is not limited to said isocyanate.

Alumina hydrate can be an inorganic compound having the formula $Al_2O_3.3H_2O$ and can be commercially available ones. The alumina hydrate gradually decomposed (from about 200° C.) to discharge crystal water at the initial thermal decomposition temperature of the liquid rubber (the decomposition initiates at about 250° C. and become severe at 400° C.), and accordingly, the alumina hydrate is preferably used as a flame retarder for the liquid rubber.

Magnesium hydroxide can be a compound having the formula $Mg(OH)_2$ and can be commercially available ones. The magnesium hydroxide gradually decomposed to initiate the discharge of water at about 300° C. to finish the discharge of water at about 350° C. and accordingly, it imparts excellent flame retardant effect as a flame retarder for the liquid rubber.

The flame retarders used in the present invention have not any toxicity and are economical and optimum as the flame retarders for the liquid rubber. Both of the flame retarders should be used. When only alumina hydrate is incorporated to impart sufficient flame retardancy, to the liquid rubber, the elasticity of the cured product is remarkably low to give only smaller elongation. When only magnesium hydroxide is incorporated, the viscosity of the liquid rubber is remarkably high to obtain a composition which has inferior processability for the casting or the impregnation and to cause inferior mechanical strength of the cured product.

The objects of the present invention have been attained by incorporating alumina hydrate and magnesium hydroxide as the flame retarders for the liquid rubber at a specific ratio in view of the thermal decomposition characteristics of the liquid rubber and the thermal decomposition characteristics of the flame retarders and the reinforcing properties of the decomposed flame retarders.

When the ratio of alumina hydrate to magnesium hydroxide is out of the above-mentioned range, the flame retardancy of the cured product is not sufficient or the processability for the casting or the impregnation are inferior or the physical property of the cured product is inferior, to be disadvantageous.

The composition of the present invention can be used by itself and also can be used after incorporating one or more other additives such as a coloring agent, a fungicide, an antioxidant and an ultraviolet absorber.

The present invention will be further illustrated by certain examples and references which are provided for purposes of illustration only and are not intended to be limiting the present invention.

REFERENCE 1

Preparation of hydrogenated polyhydroxybutadiene polymer

In a 1 liter autoclave, 120 g. of polyhydroxybutadiene polymer (60 mol % of 1,4-trans; 20 mol % of 1,4-cis; 20 mol % of 1,2-vinyl; 44 of hydroxyl value) (Poly BD R-45M manufactured by Arco Co.), 10 g. of Raney nickel catalyst and 100 g. of dioxane were charged and hydrogen was fed at 80° C. under hydrogen pressure of 10 kg./cm$^2$ to obtain a hydrogenated polyhydroxybutadiene polymer (95% of hydrogenation percent).

REFERENCE 2

In accordance with the process of Reference 1, 100 g. of a polyhydroxybutadiene-styrene copolymer {butadiene homopolymer (60 ml % of 1,4-trans; 20 mol % of 1,4-cis and 20 mol % of 1,2-vinyl); styrene of 75:25 by weight and 42 of hydroxyl value} (Poly BD CS-15 manufactured by Arco Co.) was hydrogenated to obtain a hydrogenated polyhydroxybutadiene polymer (98% of hydrogenation percent).

REFERENCE 3

In accordance with the process of Reference 1, 100 g. of a polyhydroxybutadiene polymer (90 mol % of 1,2-vinyl; 10 mol % of 1,4-bond; 58 of hydroxyl value)(-Nisso PBG-2000 manufactured by Nippon Soda K.K.) was hydrogenated to obtain a hydrogenated polyhydroxybutadiene polymer (98% of hydrogenation percent).

[A] Examples using castor oil as a part of the major component

EXAMPLE 1

In a vessel, 100 g. of the hydrogenated polyhydroxybutadiene polymer obtained in Reference 1, 50 g. of purified castor oil, 125 g. of alumina hydrate 25 g. of magnesium hydroxide and 3 g. of carbon black were charged and heated at 80° C. with stirring and the mixture was kneaded in a sheet form by a three roll mill so as to uniformly disperse the filler and carbon black. A half of the mixture was charged in a 200 cc. tall beaker and heated in an oil bath at 85° C. and then, 7.6 g. of 3-isocyanatomethyl-3,5,5-trimethylcyclohexyl isocyanate was admixed. A time from the initial viscosity of 71 poises (reaching to 85° C.) to the viscosity of 1,000 poises was measured to give 52 minutes.

The remainder of the mixture was admixed with 7.6 g. of the same isocyanate and the mixture was deaerated at 80° C. and poured into a mold made of polypropylene. After pouring, the mold was heated at 150° C. for 1 hour to obtain a cured sheet having a size of 40 cm×40 cm×0.2 cm.

Mechanical characteristics (tensile strength, elongation) electric characteristics (volumetric inherent resistance; arc resistance; tracking resistance); flammability, water-proof property and heat resistance of the cured sheet were measured. The results of the measurements are shown in Table 1.

The flame retardant liquid rubber composition of the present invention had a long pot life to have excellent casting processability. The cured products had excellent characteristics as shown in Table 1.

TABLE 1

| Test | Measurement | Normal condition | After heating at 130° C. for 500 hr. | After dipping in water at 80° C. for 7 day |
|---|---|---|---|---|
| Tensile strength (kg./cm$^2$) | JIS K 6301 | 63 | 68 | 61 |
| Elongation (%) | " | 290 | 250 | 270 |
| Vol. inherent resistance ($\Omega$.cm) | JIS K 6911 | $7.5 \times 10^{15}$ | $6.0 \times 10^{15}$ | $5.4 \times 10^{14}$ |
| Arc resistance (sec.) | " | 130 | 126 | 125 |
| Tracking resistance (kV) | Dip method | >3 | >3 | >3 |
| Flammability (O.I.) | JIS K 7201 | 25.4 | 25.4 | 25.4 |

EXAMPLES 2 TO 7

In accordance with the process of Example 1, each hydrogenated polyhydroxybutadiene polymer obtained in Reference 1, 2 or 3, the purified castor oil, alumina hydroxide, magnesium hydroxide and carbon black at ratios shown in Table 2 were kneaded to obtain mixtures in a sheet form. Each of the mixtures was admixed with 3-isocyanatomethyl-3,5,5-trimethylcyclohexyl isocyanate at ratios shown in Table 2 and each time for viscosity change was measured in accordance with the process of Example 1.

Each of the mixtures was also admixed with the same isocyanate and cured and the characteristics of the cured product were also measured in accordance with the process of Example 1. The results are shown in Table 2.

TABLE 2

| Composition (wt. part) | Example 2 | 3 | 4 | 5 | 6 | 7 |
|---|---|---|---|---|---|---|
| Hydrogenated polymer | | | | | | |
| Reference 1 | 100 | 100 | — | — | — | — |
| Reference 2 | — | — | 100 | 100 | 100 | 100 |
| Reference 3 | — | — | — | — | — | 100 |
| Castor oil | 50 | 100 | 20 | 60 | 120 | 40 |
| 3-isocyanatomethyl-3,5,5-trimethyl-cyclohexyl isocyanate | 22.3 | 45.8 | 14.7 | 27.6 | 51.6 | 31.6 |
| Alumina hydrate | 140 | 160 | 60 | 120 | 150 | 100 |
| Magnesium hydroxide | 10 | 40 | 60 | 40 | 50 | 30 |
| Carbon black (thermal black) | 3 | 3 | 3 | 3 | 3 | 3 |
| Initial viscosity (poise) | 75 | 45 | 110 | 58 | 21 | 62 |
| Time reaching to 1,000 poise (at 100° C.) (min.) | 53 | 69 | 37 | 61 | 74 | 58 |

TABLE 2-continued

| Composition (wt. part) | Example | | | | | |
|---|---|---|---|---|---|---|
| | 2 | 3 | 4 | 5 | 6 | 7 |
| Tensile strength (kg./cm$^2$) | 105 | 125 | 87 | 110 | 134 | 93 |
| Elongation (%) | 270 | 230 | 290 | 260 | 210 | 340 |
| Vol. inherent resistance (Ω.cm) | 3.4 × 10$^{15}$ | 6.5 × 10$^{14}$ | 2.5 × 10$^{15}$ | 1.0 × 10$^{15}$ | 7.5 × 10$^{14}$ | 2.5 × 10$^{15}$ |
| Arc resistance (sec.) | 118 | 105 | 136 | 110 | 95 | 125 |
| Tracking resistance (kV) | >3 | >3 | >3 | >3 | >3 | >3 |
| Flammability (O.I.) | 24.6 | 23.2 | 25.4 | 24.6 | 23.2 | 23.2 |

[B] Isocyanate prepolymer of castor oil as curing agent

REFERENCE 4

In a 1 liter four necked flask equipped with a nitrogen gas inlet, a dropping funnel, a stirrer and a thermometer, 333.6 g. of 3-isocyanatomethyl-3,5,5-trimethylcyclohexyl isocyanate was charged and nitrogen gas was fed and the mixture was heated to 80° C. with stirring and 517.5 g. of castor oil was gradually added dropwise at the same temperature through the dropping funnel, during 1 hour and the mixture was further stirred at 80° C. for 1 hour to obtain an isocyanate prepolymer having 530 of isocyanate equivalent.

REFERENCE 5

In the reactor of Reference 4, 333.6 g. of 3-isocyanatomethyl-3,5,5-trimethylcyclohexyl isocyanate was charged and heated to 80° C. and 310.5 g. of castor oil was added dropwise through a dropping funnel under controlling the reaction temperature to lower than 120° C. After the addition, the mixture was stirred at 110° C. for 1 hour to obtain an isocyanate prepolymer having 145 of isocyanate equivalent.

EXAMPLE 8

In a vessel, 100 g. of the hydrogenated polyhydroxybutadiene polymer, 125 g. of alumina hydrate, 25 g. of magnesium hydroxide, and 3 g. of carbon black were charged and heated at 80° C. with stirring and the mixture was kneaded in a sheet form by a three roll mill to uniformly disperse the filler and carbon black.

In a 200 cc tall beaker, 100 g. of the mixture was charged and heat-melted in an oil bath at 85° C. and then 18.1 g. of the isocyanate prepolymer obtained in Reference 4 was admixed. A time from the initial viscosity of 150 poise (reaching to 85° C.) to the viscosity of 1,000 poises was measured to give 31 minutes.

The same mixture was admixed with the same isocyanate prepolymer and the mixture was deaerated at 80° C. and poured into a mold made of polypropylene. After pouring, the mold was heated at 150° C. for 1 hour to obtain a cured sheet having a size of 40 cm × 40 cm × 0.2 cm.

Mechanical characteristics (tensile strength, elongation) electric characteristics (volumetric inherent resistance; arc resistance; tracking resistance); flammability, water-proof property and heat resistance of the cured sheet were measured. The results of the measurements are shown in Table 3.

The flame retardant liquid rubber composition of the present invention had a long pot life to have excellent casting processability. The cured products had excellent characteristics as shown in Table 3.

TABLE 3

| Test | Measurement | Normal condition | After heating at 130° C. for 500 hr. | After dipping in water at 80° C. for 7 days |
|---|---|---|---|---|
| Tensile strength (kg./cm$^2$) | JIS K 6301 | 56 | | |
| Elongation (%) | " | 280 | | |
| Vol. inherent resistance (Ω.cm) | JIS K 6911 | 6.8 × 10$^{15}$ | | |
| Arc resistance (sec.) | " | 128 | 128 | 131 |
| Tracking resistance (kV) | Dip method | >3 | >3 | >3 |
| Flammability (O.I.) | JIS K 7201 | 27.2 | 27.2 | 27.2 |

EXAMPLES 9 TO 15

In accordance with the process of Example 8, each hydrogenated polyhydroxybutadiene polymer obtained in Reference 1, 2 or 3, alumina hydrate, magnesium hydroxide and carbon black at ratios shown in Table 4 were kneaded to obtain mixtures in a sheet form. Each of the mixtures was admixed with the isocyanate prepolymer obtained in Reference 4 or 5 at ratios shown in Table 4 and each time for viscosity change was measured in accordance with the process of Example 8.

Each of the mixtures was also admixed with the isocyanate prepolymer and cured and the characteristics of the cured product were also measured in accordance with the process of Example 8. The results are shown in Table 4.

TABLE 4

| Composition (wt. part) | Example | | | | | | |
|---|---|---|---|---|---|---|---|
| | 9 | 10 | 11 | 12 | 13 | 14 | 15 |
| Hydrogenated polymer | | | | | | | |
| Reference 1 | 91.7 | — | — | — | 68.6 | 68.6 | 68.6 |
| Reference 2 | — | 71.6 | 69.6 | — | — | — | — |
| Reference 3 | — | — | — | 60.3 | — | — | — |
| Isocyanate prepolymer | | | | | | | |

TABLE 4-continued

| Composition (wt. part) | Example 9 | 10 | 11 | 12 | 13 | 14 | 15 |
|---|---|---|---|---|---|---|---|
| Reference 4 | — | 28.4 | 30.4 | 39.7 | 31.4 | 31.4 | 31.4 |
| Reference 5 | 8.3 | — | — | — | — | — | — |
| Alumina hydrate | 145 | 140 | 120 | 60 | 60 | 150 | 150 |
| Magnesium hydroxide | 5 | 10 | 30 | 5 | 30 | 5 | 30 |
| Carbon black (thermal black) | 3 | 3 | 3 | 3 | 3 | 3 | 3 |
| Initial viscosity (poise) | 83 | 110 | 180 | 38 | 50 | 95 | 290 |
| Time reaching to 1,000 poises at 85° C. (min) | 34 | 33 | 30 | 37 | 36 | 32 | 23 |
| Tensile strength (kg./cm$^2$) | 61 | 59 | 50 | 90 | 93 | 65 | 43 |
| Elongation (%) | 220 | 240 | 300 | 380 | 340 | 200 | 145 |
| Vol. inherent resistance ($\Omega$.cm) | $6.5 \times 10^{15}$ | $4.0 \times 10^{15}$ | $1.5 \times 10^{15}$ | $8.6 \times 10^{15}$ | $4.6 \times 10^{15}$ | $3.5 \times 10^{15}$ | $6.3 \times 10^{14}$ |
| Arc resistance (sec.) | 118 | 124 | 132 | 94 | 105 | 135 | 153 |
| Tracking resistance (kV) | >3 | >3 | >3 | >3 | >3 | >3 | >3 |
| Flammability (O.I.) | 26.3 | 26.8 | 27.6 | 23.7 | 24.6 | 27.6 | 31 |

As shown in Table 4, the elongation and the flame retardancy of the cured products obtained from the flame retardant liquid rubber compositions of the present invention are improved but the melt viscosity of the composition is increased depending upon the increase of the amount of magnesium hydroxide in the alumina hydrate and magnesium hydroxide. Therefore, magnesium hydroxide is not preferably incorporated in the amount of more than 30 wt. parts. When the amount of magnesium hydroxide is less than 5 wt. parts, the flame retardancy is disadvantageously too low. In order to impart sufficient flame retardancy to the cured product in the case of less than 5 wt. parts of magnesium hydroxide, the amount of alumina hydrate should be increased. If a large amount of alumina hydrate is incorporated in the composition, the elongation of the cured product is lowering to be inferior elasticity. The amount of alumina hydrate is preferably in a range of 60 to 150 wt. parts.

As it is shown in the examples in the cases [A] and [B], the flame retardant liquid rubber compositions of the present invention have suitable viscosity for the casting and the impregnation and have suitable pot-life. The cured products are elastic products having excellent electric insulating property, high arc resistance, high tracking resistance, high water-proof property, high heat resistance and excellent flame retardancy. The industrial value of the present invention is remarkable.

We claim:

1. A flame retardant liquid rubber composition comprising:

a hydrogenated polyhydroxybutadiene polymer and a castor oil which are modified with an isocyanate having the formula:

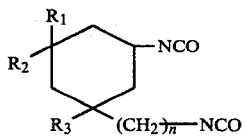

wherein $R_1$, $R_2$ and $R_3$ independently represent a lower alkyl group or hydrogen atom and n is an integer from 1 to 4, alumina hydrate, and magnesium hydroxide, wherein said composition comprises 100 parts by weight of said hydrogenated polyhydroxybutadiene polymer, 10 to 150 parts by weight of said castor oil, 60 to 180 parts by weight of alumina hydrate, and 5 to 60 parts by weight of magnesium hydroxide.

2. The flame retardant liquid rubber composition according to claim 1 wherein said hydrogenated polyhydroxybutadiene polymer has more than 60 wt.% of 1,4-butadiene moiety in the chain of the polymer.

3. The flame retardant liquid rubber composition according to claim 1 wherein said hydrogenated polyhydroxybutadiene polymer has more than 60 wt.% of butadiene moiety and less than 40 wt.% of styrene moiety in the chain of the polymer.

4. The flame retardant liquid rubber composition according to claim 1 wherein said isocyanate is incorporated at a ratio of 0.8 to 1.5 equivalent as isocyanate groups per 1 equivalent of hydroxyl groups in the sum of said hydrogenated polyhydroxybutadiene polymer and castor oil.

5. The flame retardant liquid rubber composition according to claim 1 which is prepared by incorporating 100 wt. parts of thermosettable components including said hydrogenated polyhydroxybutadiene polymer and an isocyanate prepolymer obtained by reacting castor oil with said isocyanate having the formula

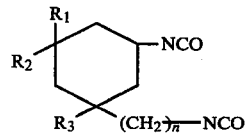

wherein $R_1$, $R_2$ and $R_3$ independently represent a lower alkyl group or hydrogen atom and n is an integer of 1 to 4, and 60 to 150 wt. parts of alumina hydrate and 5 to 30 wt. parts of magnesium hydroxide.

6. The flame retardant liquid rubber composition according to claim 1 or 5 wherein $R_1$, $R_2$ and $R_3$ are methyl groups.

* * * * *